(12) United States Patent
Kuboushek et al.

(10) Patent No.: US 12,550,801 B2
(45) Date of Patent: Feb. 17, 2026

(54) WHEEL ASSEMBLY FOR AN AGRICULTURAL IMPLEMENT

(71) Applicant: CNH Industrial America LLC, New Holland, PA (US)

(72) Inventors: Brandon James Kuboushek, Manhattan, IL (US); Michael J. Connors, Lockport, IL (US); Kregg J. Raducha, Oak Park, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 285 days.

(21) Appl. No.: 18/505,252

(22) Filed: Nov. 9, 2023

(65) Prior Publication Data
US 2025/0151638 A1    May 15, 2025

(51) Int. Cl.
*A01B 63/22*    (2006.01)
*A01B 73/06*    (2006.01)

(52) U.S. Cl.
CPC ............ *A01B 63/22* (2013.01); *A01B 73/065* (2013.01)

(58) Field of Classification Search
CPC ............................... A01B 63/22; A01B 73/065
See application file for complete search history.

(56) References Cited

U.S. PATENT DOCUMENTS

| | | | |
|---|---|---|---|
| 5,787,988 A | 8/1998 | Harlan et al. | |
| 9,096,264 B2 * | 8/2015 | Connors | A01C 7/208 |
| 9,763,376 B2 * | 9/2017 | Blackwell | A01B 73/065 |
| 10,638,653 B2 | 5/2020 | Anderson et al. | |
| 10,729,054 B2 | 8/2020 | DeKam | |
| 10,888,044 B2 | 1/2021 | Kinzenbaw et al. | |
| 2006/0191695 A1 | 8/2006 | Walker et al. | |
| 2021/0368668 A1 | 12/2021 | Dekam et al. | |
| 2025/0024770 A1 * | 1/2025 | Ryder | A01B 63/008 |

* cited by examiner

*Primary Examiner* — Bryan A Evans
(74) *Attorney, Agent, or Firm* — Fletcher Yoder, P.C.

(57) ABSTRACT

A wheel assembly for an agricultural implement includes a linkage assembly having a mount configured to be non-rotatably coupled to a toolbar of the agricultural implement. The linkage assembly also includes a first link pivotally coupled to the mount and a second link pivotally coupled to the mount. Furthermore, the linkage assembly includes a wheel support pivotally coupled to the first link and to the second link, in which the wheel support is configured to rotatably couple to a wheel at a wheel pivot. The linkage assembly is configured to transition between a raised position and a lowered position to control a vertical position of the wheel pivot relative to the toolbar, and the linkage assembly is configured to position the wheel pivot at a first longitudinal location forward of a longitudinal centerline of the toolbar while in the raised position.

20 Claims, 4 Drawing Sheets

WHEEL ASSEMBLY FOR AN AGRICULTURAL IMPLEMENT

BACKGROUND

The present disclosure relates to a wheel assembly for an agricultural implement.

Generally, planting implements (e.g., planters) are towed behind a tractor or other work vehicle. Planting implements typically include multiple row units distributed across a width of the planting implement. Each row unit is configured to deposit agricultural product (e.g., seed) at a desired depth beneath the soil surface of a field, thereby establishing rows of planted agricultural product. For example, each row unit typically includes a ground engaging tool or opener that forms a trench for agricultural product (e.g., seed) deposition into the soil. An agricultural product conveying system (e.g., agricultural product tube or powered agricultural product conveyor) is configured to deposit the agricultural product into the trench. The opener/agricultural product conveying system may be followed by closing discs that move displaced soil back into the trench and/or a packer wheel that packs the soil on top of the deposited agricultural product.

The row units of the planting implement are mounted to a toolbar, and the toolbar is coupled to a tongue assembly. The tongue assembly includes a hitch configured to couple to a corresponding hitch of the work vehicle, thereby enabling the work vehicle to tow the planting implement through a field. Certain planting implements include wheel assemblies coupled to the toolbar and configured to support the planting implement in a working configuration and in a transport configuration. Each wheel assembly may include a wheel support pivotally coupled to the toolbar and extending rearwardly from the toolbar. Each wheel assembly may also include a wheel rotatably coupled to the wheel support. In addition, each wheel assembly may include an actuator configured to drive the wheel to move between a working position, in which the wheel is positioned closer to the toolbar along a vertical axis, and a transport position, in which the wheel is positioned farther from the toolbar along the vertical axis. With the wheels in the working position, the planting implement is in the working configuration with the row units engaged with the soil, and with the wheels in the transport position, the planting implement is in the transport configuration with the row units disengaged from the soil. The wheel assemblies are positioned between the row units, and the wheels are positioned rearward of the toolbar. Due to the position of the wheels, the planting implement applies a downward load on the work vehicle hitch while the planting implement is in the transport configuration. Unfortunately, for planting implements configured to establish a narrow row spacing, the distance between row units on the toolbar may be insufficient to position the wheel assemblies between the row units.

BRIEF DESCRIPTION

In certain embodiments, a wheel assembly for an agricultural implement includes a linkage assembly having a mount configured to be non-rotatably coupled to a toolbar of the agricultural implement. The linkage assembly also includes a first link pivotally coupled to the mount and a second link pivotally coupled to the mount. Furthermore, the linkage assembly includes a wheel support pivotally coupled to the first link and to the second link, in which the wheel support is configured to rotatably couple to a wheel at a wheel pivot. The linkage assembly is configured to transition between a raised position and a lowered position to control a vertical position of the wheel pivot relative to the toolbar, the linkage assembly is configured to position the wheel pivot at a first longitudinal location forward of a longitudinal centerline of the toolbar while in the raised position, the linkage assembly is configured to position the wheel pivot at a second longitudinal location at or rearward of the longitudinal centerline of the toolbar while in the lowered position, and the linkage assembly is configured to move the wheel pivot from the first longitudinal location to the second longitudinal location in response to transitioning from the raised position to the lowered position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
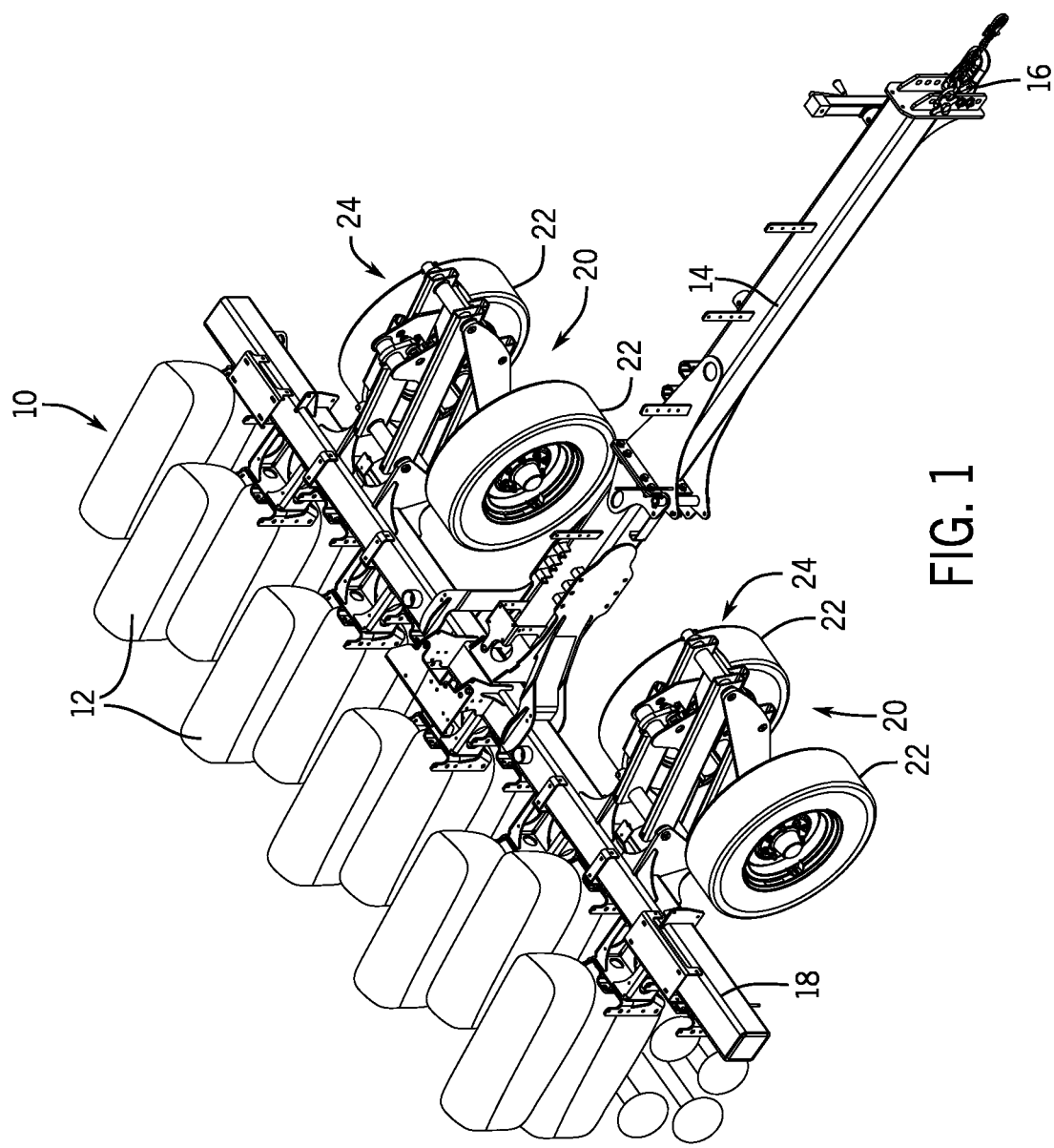
FIG. 1 is a perspective view of an embodiment of an agricultural implement having multiple row units distributed across a width of the agricultural implement.

FIG. 1 is a perspective view of an embodiment of an agricultural implement 10 (e.g., planting implement, planter) having multiple row units 12 distributed across a width of the agricultural implement 10. The agricultural implement 10 is configured to be towed through a field behind a work vehicle, such as a tractor. As illustrated, the agricultural implement 10 includes a tongue assembly 14, which includes a hitch 16 configured to couple to a corresponding hitch of the work vehicle. The tongue assembly 14 is coupled to a toolbar 18 that supports multiple row units 12. Each row unit 12 may include one or more opener discs configured to form a trench within soil of a field. The row unit 12 may also include an agricultural product conveying system (e.g., agricultural product tube or powered agricultural product conveyer) configured to deposit agricultural product (e.g., seed) into the trench. In addition, the row unit 12 may include closing disc(s) and/or a packer wheel positioned behind the agricultural product conveying system. The closing disc(s) are configured to move displaced soil back into the trench, and the packer wheel is configured to pack soil on top of the deposited agricultural product.

In the illustrated embodiment, each row unit 12 of the agricultural implement 10 includes an agricultural product meter and a storage compartment (e.g., hopper, mini-hopper, etc.). In certain embodiments, the storage compartment (e.g., hopper) stores a sufficient amount of agricultural product to complete a desired planting operation. Furthermore, in certain embodiments, the storage compartment (e.g., mini-hopper) is configured to receive agricultural product (e.g., continuously, periodically, on-demand, etc.) from a central storage compartment of the agricultural implement during the planting operation. The agricultural product meter (e.g., vacuum agricultural product meter) is configured to control a flow rate of the agricultural product (e.g., seed, fertilizer, other agricultural product, etc.) to the agricultural product conveying system, thereby controlling the flow rate of the agricultural product into the trench. As a result, a desired distribution of the agricultural product throughout the field (e.g., a desired seed spacing along a respective seed row) may be established.

In the illustrated embodiment, the agricultural implement 10 includes two wheel assemblies 20 configured to support the agricultural implement 10 in the illustrated working configuration and in a transport configuration. Each wheel assembly 20 includes one or more wheels 22 and a linkage assembly 24. As discussed in detail below, each linkage assembly 24 includes a mount non-rotatably coupled to the toolbar 18, a first link pivotally coupled to the mount, a second link pivotally coupled to the mount, and a wheel support pivotally coupled to the first link and to the second link. The wheel support is rotatably coupled to the wheel(s) at a wheel pivot. While each wheel assembly 20 includes two wheels 22 in the illustrated embodiment, in other embodiments, at least one wheel assembly may include more or fewer wheels (e.g., 1, 3, 4, or more).

Each linkage assembly 24 is configured to control movement of the respective wheel(s) 22 between a working position and a transport position. The linkage assembly 24 is configured to position the wheel pivot farther from the toolbar 18 along a vertical axis while the wheel(s) 22 are in the transport position, and the linkage assembly is configured to position the wheel pivot closer to the toolbar 18 along the vertical axis while the wheel(s) are in the working position. With the wheels 22 in the working position, the agricultural implement 10 is in the working configuration, in which the row units 12 are engaged with the soil, thereby facilitating planting operations. Furthermore, with the wheels 22 in the transport position, the agricultural implement 10 is in the transport configuration, in which the row units 12 are disengaged from the soil, thereby facilitating transport of the agricultural implement 10 (e.g., through a field, along a road, etc.).

Furthermore, each linkage assembly 24 is configured to position the respective wheel pivot forward of a longitudinal centerline of the toolbar 18 while the wheel(s) 22 are in the working position, as illustrated. Each linkage assembly 24 is also configured to position the respective wheel pivot at or rearward of the longitudinal centerline of the toolbar 18 while the wheel(s) 22 are in the transport position. Because the wheel pivots are positioned forward of the longitudinal centerline of the toolbar 18 while the wheels 22 are in the working position, the wheels 22 do not interfere with the spacing between the row units 12 (e.g., as compared to a configuration in which the wheels are positioned between row units). As a result, the row units 12 may be tightly spaced along the toolbar 18, thereby enabling the agricultural implement 10 to establish a narrow row spacing of the agricultural product (e.g., 15-inch row spacing, etc.). In addition, because the wheel pivots are positioned at or rearward of the longitudinal centerline of the toolbar 18 while the wheels 22 are in the transport position, the hitch 16 may apply a downward load to the corresponding hitch of the work vehicle while the agricultural implement 10 is in the transport configuration, thereby enhancing the stability of the agricultural implement 10 during transport. For example, moving the wheels 22 from the illustrated working position to the transport position moves the wheel pivots rearwardly and downwardly, moves the pivot point of the agricultural implement 10 rearwardly relative to the center of gravity of the agricultural implement, and increases a downward angle of the tongue assembly 14 toward the work vehicle hitch (e.g., to 10 degrees, to 15 degrees, to 20 degrees, etc.), which increases the downward load on the work vehicle hitch. While the wheel assemblies are disclosed herein with reference to a planting implement, the wheel assemblies may be used with any suitable type of agricultural implement (e.g., having a single toolbar and a tongue assembly), such as a seeding implement or a fertilizer applicator.

Figure 2:
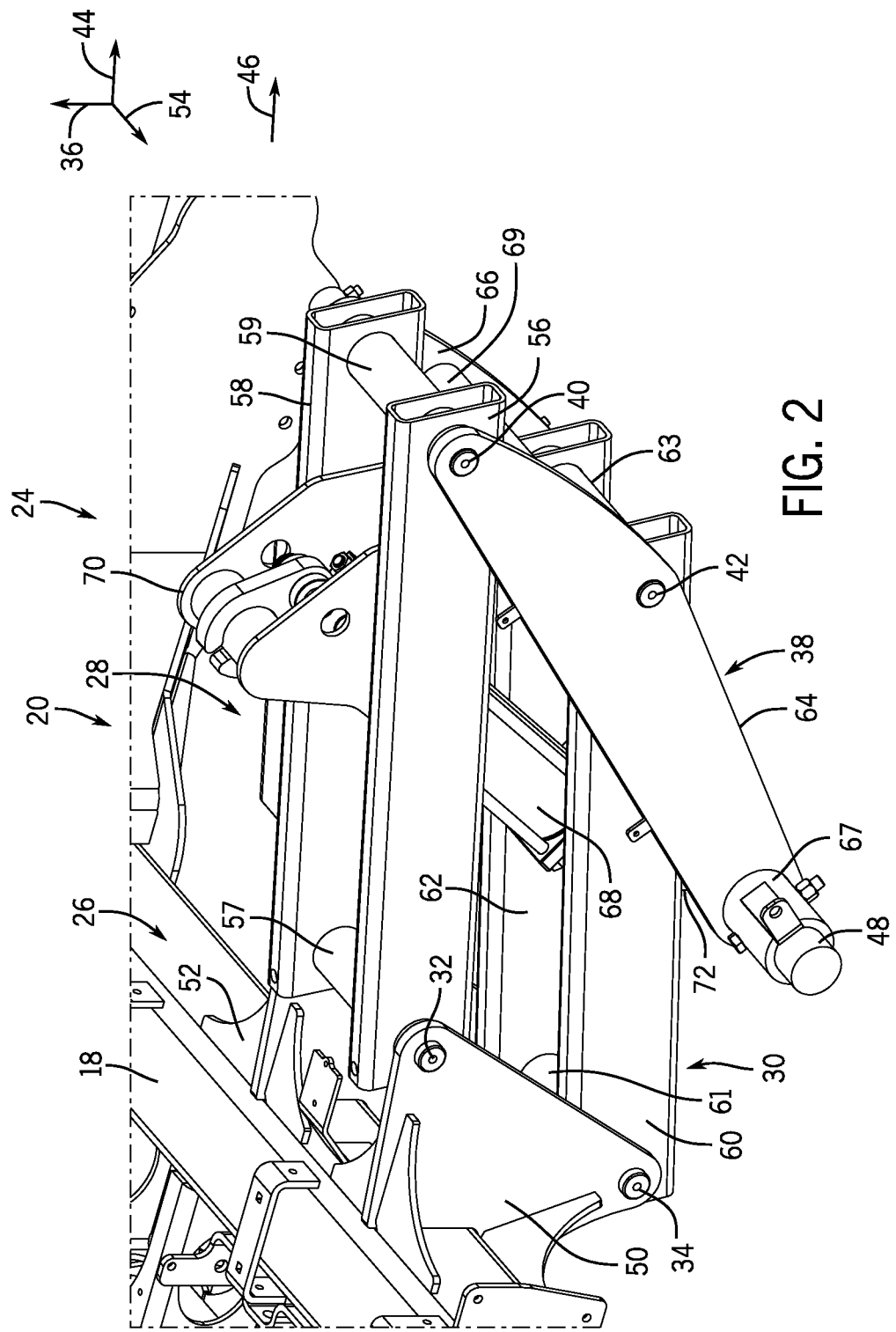
FIG. 2 is a perspective view of an embodiment of a wheel assembly that may be employed within the agricultural implement of FIG. 1.

FIG. 2 is a perspective view of an embodiment of a wheel assembly 20 that may be employed within the agricultural implement of FIG. 1. As illustrated, the wheel assembly 20 is in a working configuration, which corresponds to the working configuration of the agricultural implement. Accordingly, the linkage assembly 24 is configured to position the wheels in the working position. In the illustrated embodiment, the linkage assembly 24 includes a mount 26 non-rotatably (e.g., fixedly) coupled to the toolbar 18. The mount 26 may be non-rotatably coupled to the toolbar 18 via any suitable type(s) of connection(s), such as a welded connection, an adhesive connection, a fastener connection, other suitable type(s) of connection(s), or a combination thereof.

Furthermore, in the illustrated embodiment, the linkage assembly 24 includes a first link 28 and a second link 30. The first link 28 is pivotally coupled to the mount 26 via a first pivot 32, and the second link 30 is pivotally coupled to the mount 26 via a second pivot 34. Each pivot may include any suitable component(s) configured to facilitate pivotal movement of the respective link relative to the mount. For example, in certain embodiments, at least one pivot may include axle(s), bushing(s), bearing(s), fastener(s), other suitable component(s), or a combination thereof. As illustrated, the first pivot 32 is positioned above the second pivot 34 with respect to a vertical axis 36 of the agricultural implement. Accordingly, with the wheel assembly 20 in the illustrated working configuration, the first link 28 is positioned above the second link 30.

In the illustrated embodiment, the linkage assembly 24 also includes a wheel support 38 pivotally coupled to the first link 28 via a third pivot 40 and to the second link 30 via a fourth pivot 42. Each pivot may include any suitable component(s) configured to facilitate pivotal movement of the wheel support 38 relative to the respective link. For example, in certain embodiments, at least one pivot may include axle(s), bushing(s), bearing(s), fastener(s), other suitable component(s), or a combination thereof. While the wheel assembly 20 is in the illustrated working configuration, the third pivot 40 is positioned above the fourth pivot 42 with respect to the vertical axis 38, the third pivot 40 and the fourth pivot 42 are positioned forward of the first pivot 32 and the second pivot 34 with respect to a longitudinal axis 44 of the agricultural implement (e.g., with respect to a direction of travel 46 of the agricultural implement). Furthermore, the wheels are rotatably coupled to the wheel support 38 at a wheel pivot 48. The wheel pivot may include any suitable component(s) configured to facilitate rotation of the wheels relative to the wheel support 38. For example, in certain embodiments, the wheel pivot 48 may include axle(s), bushing(s), bearing(s), fastener(s), other suitable component(s), or a combination thereof.

The linkage assembly 24 is configured to transition between the illustrated raised position and a lowered position to control a vertical position of the wheel pivot 48 (e.g., a position of the wheel pivot 48 with respect to the vertical axis 36) relative to the toolbar 18. For example, the linkage assembly 24 is configured to position the wheel pivot 48 farther from the toolbar 18 along the vertical axis 36 while in the lowered position (e.g., while the wheels are in the transport position), and the linkage assembly 24 is configured to position the wheel pivot 48 closer to the toolbar 18 along the vertical axis 36 while in the raised position (e.g., while the wheels are in the working position). In addition, as discussed in detail below, the linkage assembly 24 is configured to position the wheel pivot 48 at a first longitudinal location forward of a longitudinal centerline of the toolbar 18 (e.g., forward of the longitudinal centerline with respect to the longitudinal axis 44) while in the raised position (e.g., while the wheels are in the working position), and the linkage assembly 24 is configured to position the wheel pivot 48 at a second longitudinal location at or rearward of the longitudinal centerline of the toolbar 18 (e.g., at or rearward of the longitudinal centerline with respect to the longitudinal axis 44) while in the lowered position (e.g., while the wheels are in the transport position). The linkage assembly 24 is also configured to move the wheel pivot 48 from the first longitudinal location to the second longitudinal location in response to transitioning from the raised position to the lowered position. Accordingly, the linkage assembly 24 is configured to control movement of the wheels between the working position and the transport position. As used herein with regard to the linkage assembly, "control movement of the wheels" refers to movement of the wheels caused by the linkage assembly 24 (e.g., as compared to another component of the agricultural implement).

Because the wheel pivot 48 is positioned forward of the longitudinal centerline of the toolbar 18 while the wheels 22 are in the working position, the wheels do not interfere with the spacing between the row units (e.g., as compared to a configuration in which the wheels are positioned between row units). As a result, the row units may be tightly spaced along the toolbar 18, thereby enabling the agricultural implement to establish a narrow row spacing of the agricultural product (e.g., 15-inch row spacing, etc.). In addition, because the wheel pivot 48 is positioned at or rearward of the longitudinal centerline of the toolbar 18 while the wheels are in the transport position, the hitch may apply a downward load to the corresponding hitch of the work vehicle while the agricultural implement is in the transport configuration, thereby enhancing the stability of the agricultural implement during transport. For example, moving the wheels from the illustrated working position to the transport position moves the wheel pivot 48 rearwardly and downwardly, moves the pivot point of the agricultural implement rearwardly relative to the center of gravity of the agricultural implement, and increases the downward angle of the tongue assembly 14 toward the work vehicle hitch (e.g., to 10 degrees, to 15 degrees, to 20 degrees, etc.), which increases the downward load on the work vehicle hitch.

In the illustrated embodiment, the mount 26 includes a first portion 50 and a second portion 52. The first portion 50 and the second portion 52 of the mount 26 are positioned on opposite lateral sides of the first link 28 and the second link 30 (e.g., opposite sides with respect to a lateral axis 54). Accordingly, the mount 26 may increase the structural rigidity of the linkage assembly 24. While the first portion 50 and the second portion 52 of the mount 26 are positioned on opposite lateral sides of the first and second links in the illustrated embodiment, in other embodiments, at least one portion of the mount (e.g., both portions of the mount) may be positioned laterally inward of the first link and/or the second link. Furthermore, while the mount includes two portions in the illustrated embodiment, in other embodiments, the mount may include more or fewer portions (e.g., 1, 3, 4, or more).

In the illustrated embodiment, the first link 28 includes a first link member 56 and a second link member 58. The first link member 56 is positioned proximate to the first portion 50 of the mount 26, and the second link member 58 is positioned proximate to the second portion 52 of the mount 26. While the first link 28 includes two link members in the illustrated embodiment, in other embodiments, the first link may include more or fewer link members (e.g., 1, 3, 4, or more). Furthermore, in the illustrated embodiment, each link member is formed from a tube having a generally rectangular cross-sectional shape. However, in other embodiments, at least one link member may be formed from a tube having another suitable cross-sectional shape (e.g., circular, elliptical, hexagonal, etc.). Furthermore, in certain embodiments, at least one link member may be formed from a solid rod/bar. In addition, in the illustrated embodiment, the first link 28 includes a first cross-tube 57 and a second cross-tube 59. The cross-tubes are configured to connect the first and second link members to one another, thereby increasing the structural rigidity of the first link 28. In addition, the first pivot 32 engages the first cross-tube 57, and the third pivot 40 engages the second cross-tube 59. While the first link 28 includes two cross-tubes in the illustrated embodiment, in other embodiments, at least one cross-tube (e.g., both cross-tubes) may be omitted. Furthermore, in certain embodiments, the first link may include one or more other cross-members connecting the first and second link members.

In the illustrated embodiment, the second link 30 includes a first link member 60 and a second link member 62. The first link member 60 is positioned proximate to the first portion 50 of the mount 26, and the second link member 62 is positioned proximate to the second portion 52 of the mount 26. While the second link 30 includes two link members in the illustrated embodiment, in other embodiments, the second link may include more or fewer link members (e.g., 1, 3, 4, or more). Furthermore, in the illustrated embodiment, each link member is formed from a tube having a generally rectangular cross-sectional shape. However, in other embodiments, at least one link member may be formed from a tube having another suitable cross-sectional shape (e.g., circular, elliptical, hexagonal, etc.). Furthermore, in certain embodiments, at least one link member may be formed from a solid rod/bar. In addition, in the illustrated embodiment, the second link 30 includes a first cross-tube 61 and a second cross-tube 63. The cross-tubes are configured to connect the first and second link members to one another, thereby increasing the structural rigidity of the second link 30. In addition, the second pivot 34 engages the first cross-tube 61, and the fourth pivot 42 engages the second cross-tube 63. While the second link 30 includes two cross-tubes in the illustrated embodiment, in other embodiments, at least one cross-tube (e.g., both cross-tubes) may be omitted. Furthermore, in certain embodiments, the second link may include one or more other cross-members connecting the first and second link members.

In addition, in the illustrated embodiment, the wheel support 38 includes a first portion 64 and a second portion 66. The first portion 64 and the second portion 66 of the wheel support 38 are positioned on opposite lateral sides of the first link 28 and the second link 30 (e.g., opposite sides with respect to the lateral axis 54). Accordingly, the wheel support 38 may increase the structural rigidity of the linkage assembly 24. While the first portion 64 and the second portion 66 of the wheel support 38 are positioned on opposite lateral sides of the first and second links in the illustrated embodiment, in other embodiments, at least one portion of the wheel support (e.g., both portions of the wheel support) may be positioned laterally inward of the first link and/or the second link. Furthermore, while the wheel support includes two portions in the illustrated embodiment, in other embodiments, the wheel support may include more or fewer portions (e.g., 1, 3, 4, or more). In addition, in the illustrated embodiment, the wheel support 38 includes a first cross-tube 67 and a second cross-tube 69. The cross-tubes are configured to connect the first and second portions to one another, thereby increasing the structural rigidity of the wheel support 38. As illustrated, the wheel pivot 48 engages the first cross-tube 67. While the wheel support 38 includes two cross-tubes in the illustrated embodiment, in other embodiments, at least one cross-tube (e.g., both cross-tubes) may be omitted. Furthermore, in certain embodiments, the wheel support may include one or more other cross-members connecting the first and second portions.

In the illustrated embodiment, the wheel assembly 20 includes a linear actuator 68 configured to drive the linkage assembly 24 to transition between the raised position and the lowered position, thereby moving the wheels between the working position and the transport position, respectively. Accordingly, the linear actuator 68 is configured to drive the linkage assembly 24 to move the wheels between the working position and the transport position. In the illustrated embodiment, the linear actuator 68 includes a hydraulic cylinder. However, in other embodiments, the linear actuator may include another suitable type of linear actuation device, such as an electric linear actuator (e.g., screw drive, etc.), a pneumatic cylinder, or another suitable type of linear actuation device. Furthermore, while the linear actuator 68 includes a single linear actuation device (e.g., hydraulic cylinder) in the illustrated embodiment, in other embodiments, the linear actuator may include multiple linear actuation devices (e.g., of the same type or of different types). Furthermore, in the illustrated embodiment, the linear actuator 68 is configured to extend to transition the linkage assembly 24 from the illustrated raised position to the lowered position, thereby moving the wheels from the working position to the transport position, and the linear actuator 68 is configured to retract to transition the linkage 24 from the lowered position to the raised position, thereby moving the wheels from the transport position to the working position. However, in other embodiments, the linear actuator may be configured to retract to transition the linkage assembly from the raised position to the lowered position, and the linear actuator may be configured to extent to transition the linkage from the lowered position to the raised position.

In the illustrated embodiment, the linear actuator 68 is pivotally coupled to the first link 28 and to the wheel support 38. Accordingly, as previously discussed, extension of the linear actuator 68 drives the linkage assembly 24 to transition from the illustrated raised position to the lowered position, and retraction of the linear actuator 68 drives the linkage assembly 24 to transition from the lowered position to the raised position. In the illustrated embodiment, the wheel assembly 20 includes a first lug 70 non-rotatably coupled to the first link 28 and a second lug 72 non-rotatably coupled to the wheel support 38. The linear actuator 68 is pivotally coupled to the first lug 70, thereby pivotally coupling the linear actuator 68 to the first link 28, and the linear actuator is pivotally coupled to the second lug 72, thereby pivotally coupling the linear actuator 68 to the wheel support 38. The location of the lugs and the positions of the pivotal connections between the linear actuator and the lugs may be particularly selected to control the transition of the linkage assembly in response to extension and retraction of the linear actuator (e.g., to establish a large vertical movement of the wheels from a small extension/retraction of the linear actuator). Furthermore, the lugs may be positioned to establish a desired load path through the linkage assembly. In addition, in the illustrated embodiment, the linear actuator 68 is pivotally coupled to the first lug 70 on a side of the first link 28 opposite the wheel pivot 48. However, in other embodiments, the linear actuator may be pivotally coupled to the first lug on the same side of the first link as the wheel pivot. Because the linear actuator is coupled to the components of the linkage assembly 24 in the illustrated embodiment, actuator mounting components on the toolbar are obviated, which may reduce the cost of the agricultural implement.

Each lug may be non-rotatably coupled to the respective component of the linkage assembly via any suitable type(s) of connection(s), such as a welded connection, an adhesive connection, a fastener connection, other suitable type(s) of connection(s), or a combination thereof. In the illustrated embodiment, the first lug 70 is non-rotatably coupled to the first link member 56 and to the second link member 58 of the first link 28. However, in other embodiments, the first lug may be non-rotatably coupled to a single link member of the first link and/or to one or more cross-tubes of the first link. In addition, the second lug 72 is non-rotatably coupled to the cross-tube 67 of the wheel support 38. However, in other embodiments, the second lug may be non-rotatably coupled to other suitable element(s) of the wheel support (e.g., alone or in combination with the cross-tube). Furthermore, in the illustrated embodiment, the linear actuator 68 is positioned between the first link member 56 and the second link member 58 of the first link 28 and between the first link member 60 and the second link member 62 of the second link 30 with respect to the lateral axis 54. However, in other embodiments, the linear actuator may be positioned laterally outward of the first and second links. While the linear actuator 68 is pivotally coupled to the first link 28 and to the wheel support 38 via respective lugs in the illustrated embodiment, in other embodiments, at least one lug (e.g., both lugs) may be omitted (e.g., the linear actuator may be directly pivotally coupled to the respective component(s) of the linkage assembly). In addition, while the linear actuator 68 is pivotally coupled to the first link 28 and to the wheel support 38 in the illustrated embodiment, in other embodiments, at least one end of the linear actuator may be pivotally coupled to another suitable component (e.g., the second link, the mount, the toolbar, etc.).

Figure 3:
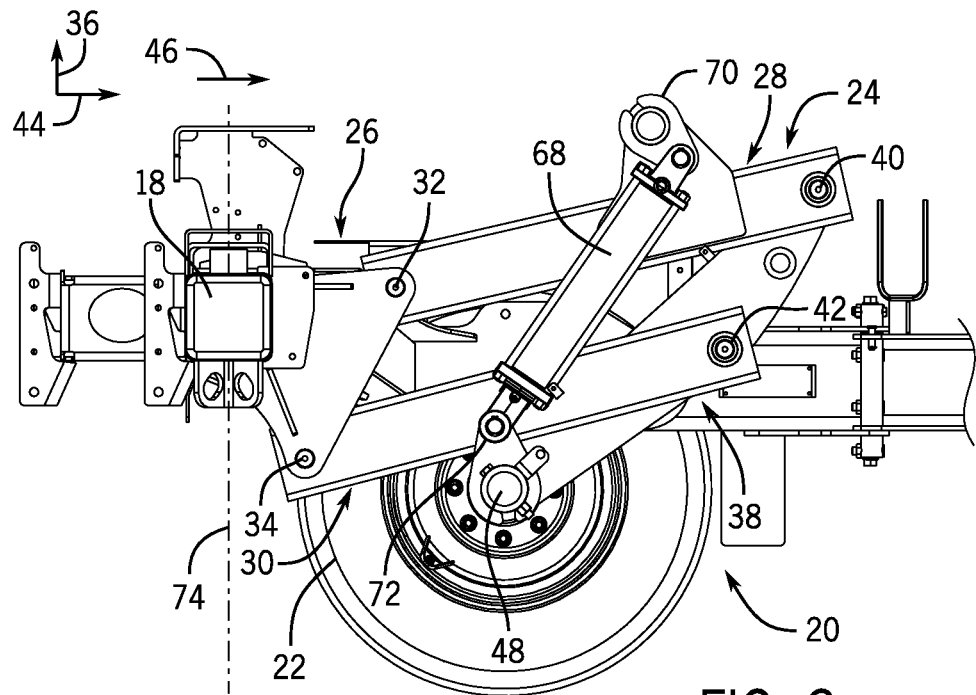
FIG. 3 is a side view of a portion of the wheel assembly of FIG. 2, in which wheels of the wheel assembly are in a working position.

FIG. 3 is a side view of a portion of the wheel assembly 20 of FIG. 2, in which wheels 22 of the wheel assembly are in the working position and the linkage assembly 24 is in the raised position. As previously discussed, the linkage assembly 24 is configured to transition between the illustrated raised position and the lowered position to control the vertical position of the wheel pivot 48 (e.g., the position of the wheel pivot 48 with respect to the vertical axis 36) relative to the toolbar 18. As illustrated, the linkage assembly 24 is configured to position the wheel pivot 48 closer to the toolbar 18 along the vertical axis 36 while in the illustrated raised position (e.g., while the wheels are in the working position), as compared to the position of the wheel pivot 48 while the linkage assembly 24 is in the lowered position. In addition, the linkage assembly 24 is configured to position the wheel pivot 48 at the first longitudinal location forward of a longitudinal centerline 74 of the toolbar 18 (e.g., forward of the longitudinal centerline 74 with respect to the longitudinal axis 44/direction of travel 46) while in the illustrated raised position (e.g., while the wheels are in the working position). Because the wheel pivot 48 is positioned forward of the longitudinal centerline 74 of the toolbar 18, the wheels 22 may engage the soil at a location forward of the location at which the row units deposit the agricultural product into the soil, such that the wheels do not compact the soil on top of the deposited agricultural product. The linkage assembly 24 is configured to position the wheel pivot 48 closer to the centerline 24 of the toolbar 18 while in the illustrated raised position, as compared to a wheel support that is pivotally coupled to the toolbar, while establishing a desired vertical position of the wheel pivot 48 while in the lowered position. As a result, the upward load applied by the hitch of the agricultural implement to the corresponding hitch of the work vehicle while the agricultural implement is in the working configuration may be reduced, thereby enhancing the stability of the agricultural implement during the planting operation. In addition, an undesirably long tongue assembly and/or counterweight(s) at the agricultural implement hitch, which may be employed in certain agricultural implements to reduce the upward load on the work vehicle hitch may be obviated, thereby reducing the cost, complexity, weight, or a combination thereof, of the agricultural implement.

In the illustrated embodiment, a length of the first link 28 is equal to a length of the second link 30. As used herein with regard to the links, "length" refers to the distance between pivots. Accordingly, the distance between the first pivot 32 and the third pivot 40 along the first link 28 is equal to the distance between the second pivot 34 and the fourth pivot 42 along the second link 30. Furthermore, in the illustrated embodiment, the distance between the first pivot 32 and the second pivot 34 along the mount 26 is equal to the distance between the third pivot 40 and the fourth pivot 42 along the wheel support 38. As used herein, "equal" refers to a difference in length/distance less than or equal to manufacturing tolerance. While the length of the first link 28 is equal to the length of the second link 30 in the illustrated embodiment, in other embodiments, the lengths of the links may be different from one another. For example, in certain embodiments, the difference in length between the first link and the second link may be less than 20 percent, less than 10 percent, less than 5 percent, less than 1 percent, or less than 0.1 percent. Furthermore, while the distance between the first pivot 32 and the second pivot 34 along the mount 26 is equal to the distance between the third pivot 40 and the fourth pivot 42 along the wheel support 38 in the illustrated embodiment, in other embodiments, the distance between the first pivot and the second pivot along the mount and the distance between the third pivot and the fourth pivot along the wheel support may be different from one another. For example, in certain embodiments, the difference in the distances may be less than 20 percent, less than 10 percent, less than 5 percent, less than 1 percent, or less than 0.1 percent. Furthermore, in the illustrated embodiment, the first pivot 32 is positioned forward of the second pivot 34 with respect to the longitudinal axis 44 (e.g., with respect to the direction of travel 46). However, in other embodiments, the first pivot may be positioned rearward of the second pivot with respect to the longitudinal axis, or the first and second pivots may be positioned at the same position with respect to the longitudinal axis.

Figure 4:
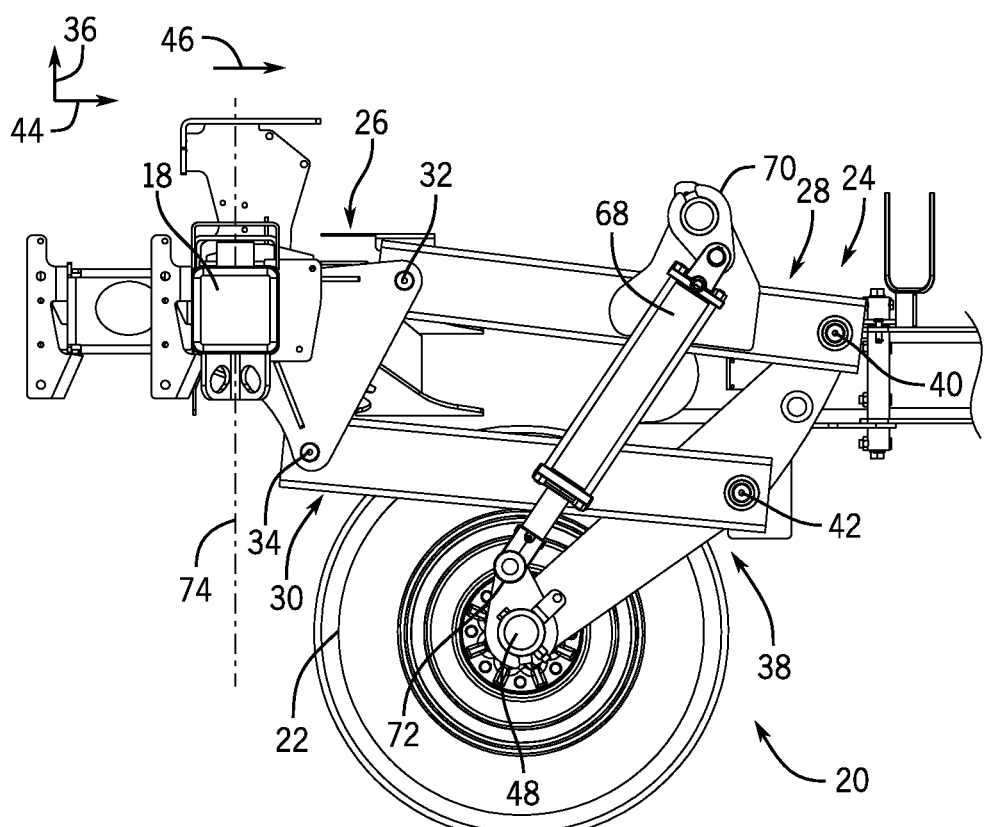
FIG. 4 is a side view of a portion of the wheel assembly of FIG. 2, in which the wheels of the wheel assembly are in a headland position.

FIG. 4 is a side view of a portion of the wheel assembly 20 of FIG. 2, in which the wheels 22 of the wheel assembly are in a headland position and the linkage assembly 24 is in a headland position. With the wheels 22 in the headland position, the wheel pivot 48 is vertically positioned between the vertical position of the wheel pivot while the wheels are in the working position and the vertical position of the wheel pivot while the wheels are in the transport position. In addition, with the wheels 22 in the headland position, the row units are disengaged from the soil, thereby enabling the agricultural implement to turn at a headland. The linkage assembly 24 is configured to position the wheel pivot 48 closer to the centerline 74 of the toolbar 18 while in the illustrated headland position, as compared to a wheel support that is pivotally coupled to the toolbar, while establishing a desired vertical position of the wheel pivot 48 while in the lowered position. As a result, the upward load applied by the agricultural implement hitch to the corresponding work vehicle hitch while the agricultural implement is transitioning to a headland configuration, in which the wheels are in the headland position, may be reduced, and the upward load applied by the agricultural implement hitch to the corresponding work vehicle hitch while the agricultural implement is in the headland configuration may be reduced, thereby enhancing the stability of the agricultural implement during the transition to the headland configuration and during the headland turn.

Figure 5:
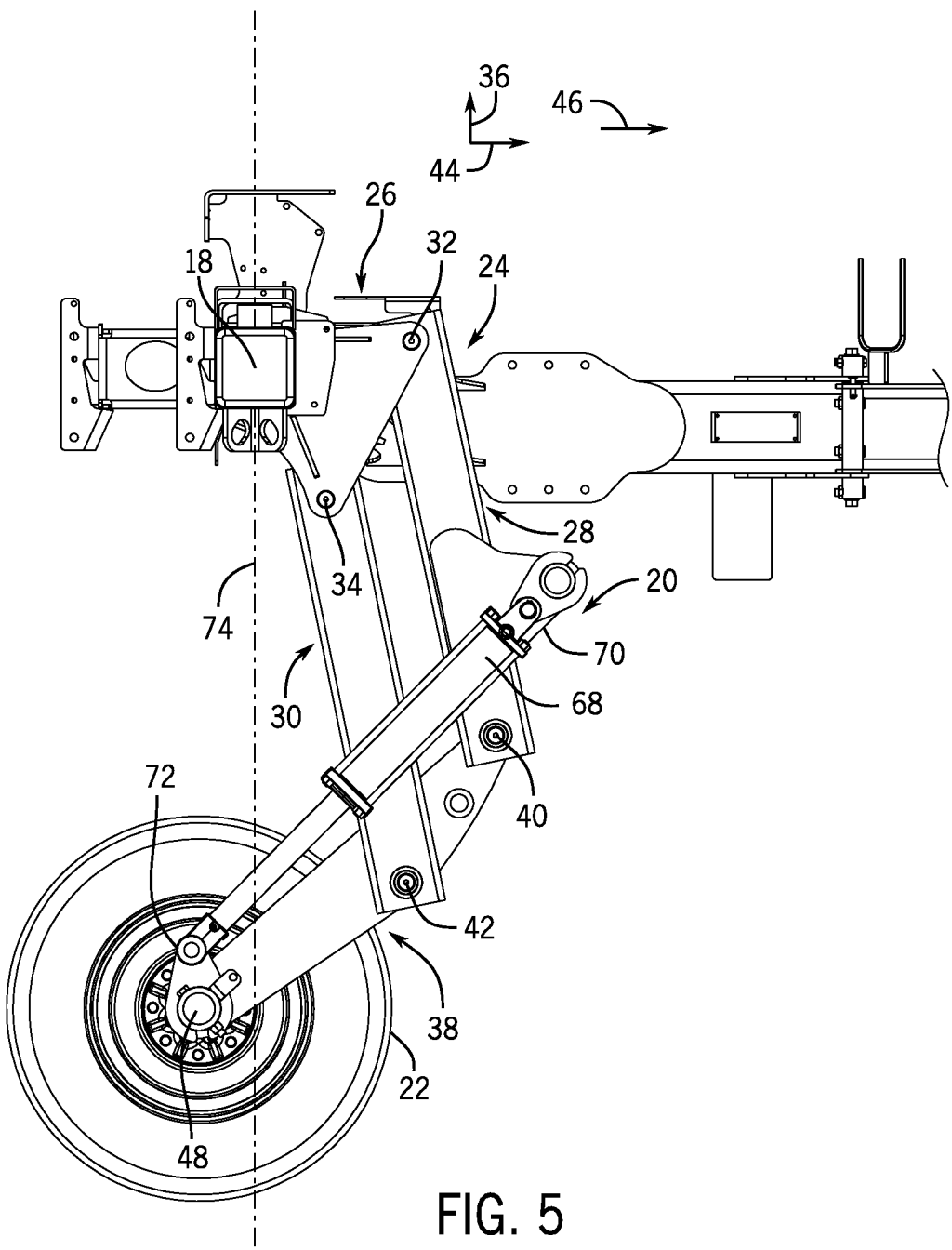
FIG. 5 is a side view of a portion of the wheel assembly of FIG. 2, in which the wheels of the wheel assembly are in a transport position.

FIG. 5 is a side view of a portion of the wheel assembly 20 of FIG. 2, in which the wheels 22 of the wheel assembly are in a transport position and the linkage assembly 24 is in the lowered position. As previously discussed, the linkage assembly 24 is configured to transition between the raised position and the illustrated lowered position to control the vertical position of the wheel pivot 48 (e.g., the position of the wheel pivot 48 with respect to the vertical axis 36) relative to the toolbar 18. As illustrated, the linkage assembly 24 is configured to position the wheel pivot 48 farther from the toolbar 18 along the vertical axis 36 while in the illustrated lowered position (e.g., while the wheels are in the transport position), as compared to the position of the wheel pivot 48 while the linkage assembly 24 is in the raised position. In addition, the linkage assembly 24 is configured to position the wheel pivot 48 at the second longitudinal location at or rearward of the longitudinal centerline 74 of the toolbar 18 (e.g., at or rearward of the longitudinal centerline 74 with respect to the longitudinal axis 44/direction of travel 46) while in the illustrated lowered position (e.g., while the wheels are in the transport position). Because the wheel pivot 48 is positioned at or rearward of the longitudinal centerline 74 of the toolbar 18 while the wheels 22 are in the transport position, the agricultural implement hitch may apply a downward load to the corresponding hitch of the work vehicle while the agricultural implement 10 is in the transport configuration, thereby enhancing the stability of the agricultural implement during transport. For example, moving the wheels 22 from the working position to the illustrated transport position moves the wheel pivot rearwardly and downwardly, moves the pivot point of the agricultural implement rearwardly relative to the center of gravity of the agricultural implement, and increases the downward angle of the tongue assembly toward the work vehicle hitch (e.g., to 10 degrees, to 15 degrees, to 20 degrees, etc.), which increases the downward load on the work vehicle hitch. As used herein with regard to the longitudinal position of the wheel pivot 48 relative to the longitudinal centerline 74 of the toolbar 18, "at" refers to a difference in longitudinal position of less than a threshold distance, such as 10 cm, 5 cm, 1 cm, or 0.5 cm.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wheel assembly for an agricultural implement, comprising:
   a linkage assembly comprising:
      a mount configured to be non-rotatably coupled to a toolbar of the agricultural implement;
      a first link pivotally coupled to the mount;
      a second link pivotally coupled to the mount; and
      a wheel support pivotally coupled to the first link and to the second link, wherein the wheel support is configured to rotatably couple to a wheel at a wheel pivot;
   wherein the linkage assembly is configured to transition between a raised position and a lowered position to control a vertical position of the wheel pivot relative to the toolbar, the linkage assembly is configured to position the wheel pivot at a first longitudinal location forward of a longitudinal centerline of the toolbar while in the raised position, the linkage assembly is configured to position the wheel pivot at a second longitudinal location at or rearward of the longitudinal centerline of the toolbar while in the lowered position, and the linkage assembly is configured to move the wheel pivot from the first longitudinal location to the second longitudinal location in response to transitioning from the raised position to the lowered position.

2. The wheel assembly of claim 1, wherein a length of the first link is equal to a length of the second link.

3. The wheel assembly of claim 1, comprising the wheel rotatably coupled to the wheel support at the wheel pivot.

4. The wheel assembly of claim 1, comprising a linear actuator configured to drive the linkage assembly to transition between the raised position and the lowered position.

5. The wheel assembly of claim 4, wherein the linear actuator is pivotally coupled to the first link and to the wheel support.

6. The wheel assembly of claim 5, comprising:
   a first lug non-rotatably coupled to the first link; and
   a second lug non-rotatably coupled to the wheel support;
   wherein the linear actuator is pivotally coupled to the first lug on a side of the first link opposite the wheel pivot, and the linear actuator is pivotally coupled to the second lug.

7. The wheel assembly of claim 4, wherein the linear actuator comprises a hydraulic cylinder.

8. A wheel assembly for an agricultural implement, comprising:
   a wheel; and
   a linkage assembly comprising:
      a mount configured to be non-rotatably coupled to a toolbar of the agricultural implement;
      a first link pivotally coupled to the mount;
      a second link pivotally coupled to the mount; and
      a wheel support pivotally coupled to the first link and to the second link, wherein the wheel is rotatably coupled to the wheel support at a wheel pivot;
   wherein the linkage assembly is configured to control movement of the wheel between a working position and a transport position, the linkage assembly is configured to position the wheel pivot farther from the toolbar along a vertical axis while the wheel is in the transport position, the linkage assembly is configured to position the wheel pivot closer to the toolbar along the vertical axis while the wheel is in the working position, the linkage assembly is configured to position the wheel pivot forward of a longitudinal centerline of the toolbar while the wheel is in the working position, and the linkage assembly is configured to position the wheel pivot at or rearward of the longitudinal centerline of the toolbar while the wheel is in the transport position.

9. The wheel assembly of claim 8, wherein a length of the first link is equal to a length of the second link.

10. The wheel assembly of claim 8, comprising a linear actuator configured to drive the linkage assembly to move the wheel between the working position and the transport position.

11. The wheel assembly of claim 10, wherein the linear actuator is pivotally coupled to the first link and to the wheel support.

12. The wheel assembly of claim 11, comprising:
   a first lug non-rotatably coupled to the first link; and
   a second lug non-rotatably coupled to the wheel support;
   wherein the linear actuator is pivotally coupled to the first lug on a side of the first link opposite the wheel pivot, and the linear actuator is pivotally coupled to the second lug.

13. The wheel assembly of claim 10, wherein the linear actuator comprises a hydraulic cylinder.

14. An agricultural implement, comprising:
a toolbar configured to support a plurality of row units; and
a wheel assembly, comprising:
- a wheel; and
- a linkage assembly comprising:
  - a mount non-rotatably coupled to the toolbar;
  - a first link pivotally coupled to the mount;
  - a second link pivotally coupled to the mount; and
  - a wheel support pivotally coupled to the first link and to the second link, wherein the wheel is rotatably coupled to the wheel support at a wheel pivot;
- wherein the linkage assembly is configured to transition between a raised position and a lowered position to control a vertical position of the wheel pivot relative to the toolbar, the linkage assembly is configured to position the wheel pivot at a first longitudinal location forward of a longitudinal centerline of the toolbar while in the raised position, the linkage assembly is configured to position the wheel pivot at a second longitudinal location at or rearward of the longitudinal centerline of the toolbar while in the lowered position, and the linkage assembly is configured to move the wheel pivot from the first longitudinal location to the second longitudinal location in response to transitioning from the raised position to the lowered position.

15. The agricultural implement of claim 14, comprising a second wheel assembly, wherein the second wheel assembly is spaced apart from the wheel assembly along the toolbar.

16. The agricultural implement of claim 14, wherein a length of the first link is equal to a length of the second link.

17. The agricultural implement of claim 14, wherein the wheel assembly comprises a linear actuator configured to drive the linkage assembly to transition between the raised position and the lowered position.

18. The agricultural implement of claim 17, wherein the linear actuator is pivotally coupled to the first link and to the wheel support.

19. The agricultural implement of claim 18, wherein the wheel assembly comprises:
- a first lug non-rotatably coupled to the first link; and
- a second lug non-rotatably coupled to the wheel support;
- wherein the linear actuator is pivotally coupled to the first lug on a side of the first link opposite the wheel pivot, and the linear actuator is pivotally coupled to the second lug.

20. The agricultural implement of claim 17, wherein the linear actuator comprises a hydraulic cylinder.

* * * * *